(12) United States Patent
Doerr

(10) Patent No.: US 8,699,836 B2
(45) Date of Patent: Apr. 15, 2014

(54) OPTICAL COUPLER

(75) Inventor: Christopher R. Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 423 days.

(21) Appl. No.: 12/498,702

(22) Filed: Jul. 7, 2009

(65) Prior Publication Data

US 2011/0008001 A1    Jan. 13, 2011

(51) Int. Cl.
  *G02B 6/34*    (2006.01)
  *G02B 6/10*    (2006.01)

(52) U.S. Cl.
  USPC .................. 385/37; 385/14; 385/50; 385/129

(58) Field of Classification Search
  None
  See application file for complete search history.

(56) References Cited

U.S. PATENT DOCUMENTS

| | | | |
|---|---|---|---|
| 4,938,595 A | 7/1990 | Parriaus et al. | |
| 6,640,034 B1 * | 10/2003 | Charlton et al. | 385/122 |
| 7,065,272 B2 | 6/2006 | Taillaert et al. | |
| 7,346,239 B2 * | 3/2008 | Romagnoli et al. | 385/39 |
| 7,359,598 B2 * | 4/2008 | Kim et al. | 385/45 |
| 7,881,571 B2 * | 2/2011 | Ben Bakir et al. | 385/37 |
| 2002/0021878 A1 * | 2/2002 | Allan et al. | 385/129 |
| 2002/0146193 A1 * | 10/2002 | Hamada | 385/15 |
| 2003/0235370 A1 * | 12/2003 | Taillaert et al. | 385/50 |
| 2004/0022489 A1 * | 2/2004 | Nesnidal et al. | 385/37 |
| 2004/0184156 A1 | 9/2004 | Gunn, III et al. | |
| 2004/0213499 A1 * | 10/2004 | Miyazaki et al. | 385/10 |
| 2009/0022448 A1 * | 1/2009 | Wu et al. | 385/10 |
| 2010/0119229 A1 | 5/2010 | Roelkens et al. | |

FOREIGN PATENT DOCUMENTS

| | | |
|---|---|---|
| JP | 2004334190 A | 11/2004 |
| JP | 2010524022 A | 7/2010 |
| WO | 02/082134 A1 | 10/2002 |
| WO | 2008/122607 A1 | 10/2008 |

OTHER PUBLICATIONS

Van Laere, Frederick, et al.; "Efficient Polarization diversity Grating Couplers in Bonded InP-Membrane"; IEEE Photoronics Technology Letters, vol. 20, No. 4, Feb. 15, 2008; pp. 318-320.
Morgan, Chris N., et al.; "Novel polarization selector based on an active waveguide photonic bandgap structure"; SPIE, vol. 5360, Jul. 23, 2004, XP040181420; pp. 129-139.
Van Laere, F.; "Nanophotonic polarization diversity demultiplexer chip"; J. Lightwave Technol., vol. 27, 2009, pp. 417-425.

(Continued)

*Primary Examiner* — Tina Wong
(74) *Attorney, Agent, or Firm* — Hitt Gaines, PC

(57) ABSTRACT

An optical device comprising a substrate having a planar surface and having an optical core thereon. The device also comprises a two-dimensional grating located in the optical core, said two-dimensional grating being formed by a regular two-dimensional pattern of light-refractive structures, one of said light-refractive structures being located at each node of a regular 2D lattice located in a laterally bounded region. The device also comprises first and second optical waveguides being on the planar substrate and having ends end-coupled to the two-dimensional grating, the first optical waveguide being such that a direction of propagation near the end thereof is substantially along a primitive lattice vector of said 2D lattice, the second optical waveguide being such that a direction of propagation near the end thereof is not-parallel to a primitive lattice vector of said regular 2D lattice.

19 Claims, 10 Drawing Sheets

(56) References Cited

OTHER PUBLICATIONS

Vermeulen, D., et al.; Silicon-on-Insulator nanophotonic waveguide circuit for fiber-to-the-home transceivers, ECOC, Tu.3.C.6, 2008.

Roelkens, G., et al.,; "Silicon-on-insulator ultra-compact duplexer based on a diffractive grating structure"; Opt. Exp. vol. 15, 2007, pp. 10091-10096.

Wang, J. et al.,; "Evanescent-coupled Ge p-i-n photodetectors on Si-waveguide with SEG-Ge and comparative study of lateral and vertical p-i-n configurations"; Electron Device Letters, IEEE, vol. 29, May 2008, pp. 445-448.

Doerr, C.R., et al.; "Polarization diversity waveguide grating receiver with integrated optical preamplifiers"; IEEE Photon. Technol. Letter., vol. 9, Jan. 1997, pp. 85-87.

Bogaerts, W., et al.; "A polarization-diversity waveguide duplexer circuit in silicon-on-insulator photonic wires"; OPT. Exp., 2007, pp. 1567-1578.

Van Laere, F., et al.; "Focusing polarization diversity grating couplers in silicon-on-insulator"; J. Lightwave Technol., vol. 27, Mar. 2009, pp. 612-618.

Taillaert, Dirk, et al.; "A Compact Two-Dimensional Grating Coupler Used as a Polarization Splitter"; IEEE Photonics Technology Letters, vol. 15, No. 9, Sep. 2003, pp. 1249-1251.

Bogaerts, W., et al.; "A polarization-diversity waveguide duplexer circuit in silicon-on-insulator photonic wires", OPT. Exp., 2007, pp. 1567-1578.

Emsley, Matthew, et al.; "Silicon Substrates With Buried Distributed Bragg Reflectors for Resonant cavity-Enhanced Optoelectronics"; IEEE Journal of Selected Topics in Quantum Electronics, vol. 8, No. 4, Jul./Aug. 2002, pp. 948-955.

Taillaert, Dirk, et al.; Compact efficient broadband grating coupler for silicon-on-insulator waveguides; Optics Letters, vol. 29, No. 23, Dec. 1, 2004, pp. 2749-2751.

\* cited by examiner

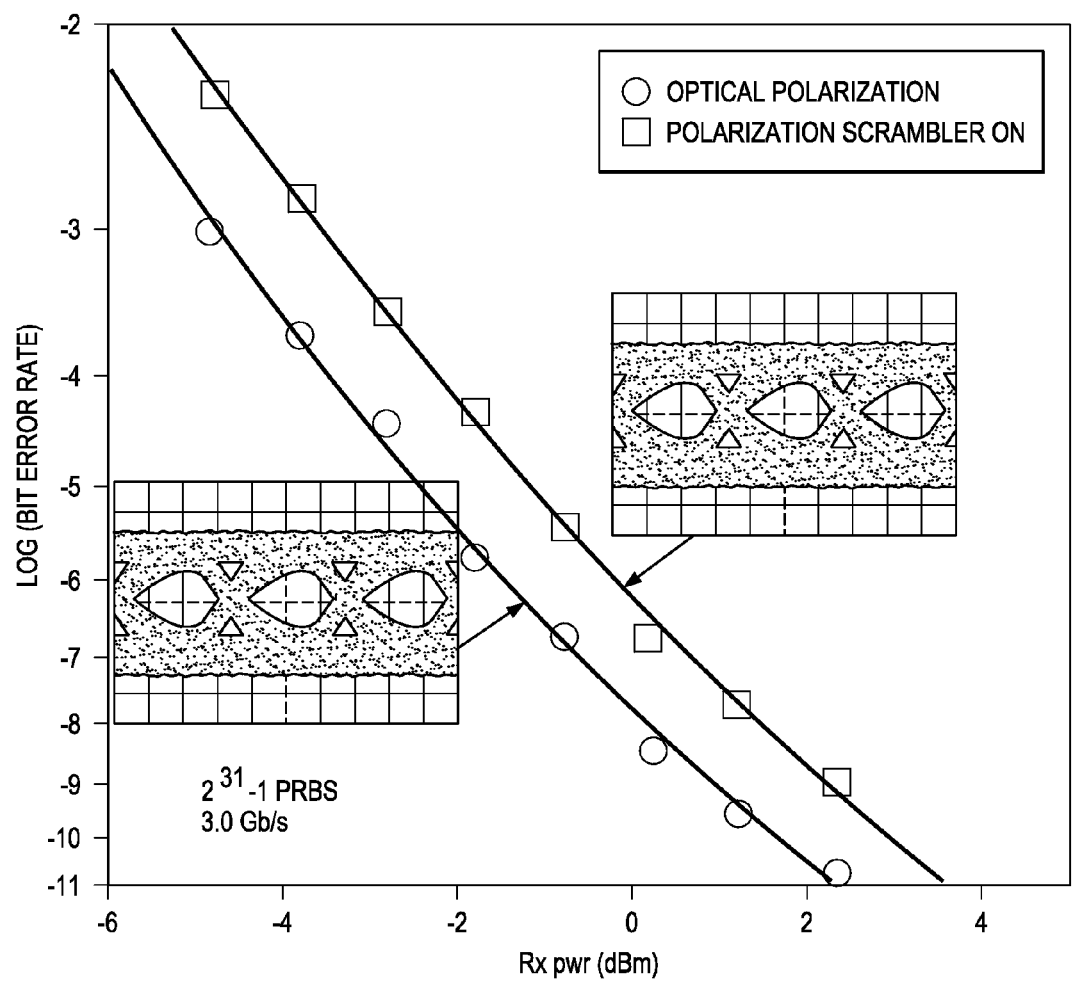

OPTICAL COUPLER

TECHNICAL FIELD

The present disclosure is directed, in general, to optical devices and more specifically, optical couplers of optical devices, and methods using and of manufacturing thereof.

BACKGROUND

This section introduces aspects that may be helpful to facilitating a better understanding of the inventions. Accordingly, the statements of this section are to be read in this light. The statements of this section are not to be understood as admissions about what is in the prior art or what is not in the prior art.

Discrete optics are presently used to make optical diplexer and triplexer optical devices for communications applications, such as fiber-to-the-home applications. For instance, diplexers and triplexers are often assembled piece-by-piece and involve several alignment procedures, thereby increasing the expense of manufacturing such devices.

SUMMARY

One embodiment is an optical device. The device comprises a substrate having a planar surface and having an optical core thereon. The device also comprises a two-dimensional grating located in the optical core, said two-dimensional grating being formed by a regular two-dimensional pattern of light-refractive structures, one of said light-refractive structures being located at each node of a regular 2D lattice located in a laterally bounded region. The device also comprises first and second optical waveguides being on the planar substrate and having ends end-coupled to the two-dimensional grating, the first optical waveguide being such that a direction of propagation near the end thereof is substantially along a primitive lattice vector of said 2D lattice, the second optical waveguide being such that a direction of propagation near the end thereof is not-parallel to a primitive lattice vector of said regular 2D lattice.

Another embodiment of an optical device comprises the above described substrate, optical core and two-dimensional grating. The device also comprises one or more optical waveguides being on the planar substrate and having ends end-coupled to the two-dimensional grating. The one or more optical waveguide are such that a direction of propagation near said end thereof is substantially along a non-primitive lattice vector of said regular 2D lattice.

Another embodiment is a method of using an optical device. The method comprises transmitting a light through an optical coupler. Transmitting includes directing said light towards a two-dimensional grating in a optical core layer, said light being directed at an angle that is substantially normal to a planar substrate that said optical core layer is located on, said two-dimensional grating being formed by a regular two-dimensional pattern of light-refractive structures, one of said light-refractive structures being located at each node of a regular 2D lattice located in a laterally bounded region. Transmitting includes diffracting said light in said two-dimensional grating such that said light exits said two-dimensional grating into first and second optical waveguides being on the planar substrate and having ends end-coupled to the two-dimensional grating, the first optical waveguide being such that a direction of propagation near the end thereof is substantially along a primitive lattice vector of said 2D lattice, the second optical waveguide being such that a direction of propagation near the end thereof is not-parallel to a primitive lattice vector of said regular 2D lattice.

Another embodiment is a method of manufacturing an optical device. The method comprises fabricating an optical coupler on a planar substrate. Fabricating the optical coupler includes forming a two-dimensional grating, includes forming a optical core layer on said substrate. Fabricating the optical coupler includes patterning said optical core layer to form a periodic arrangement of light-refractive structures, one of said light-refractive structures being located at each node of a regular 2D lattice located in a laterally bounded region. Fabricating the optical coupler includes patterning said optical core layer to form first and second optical waveguides on the planar substrate and having ends end-coupled to the two-dimensional grating, the first optical waveguide being such that a direction of propagation near the end thereof is substantially along a primitive lattice vector of said 2D lattice, the second optical waveguide being such that a direction of propagation near the end thereof is not-parallel to a primitive lattice vector of said regular 2D lattice.

BRIEF DESCRIPTION OF THE DRAWINGS

The embodiments of the disclosure are best understood from the following detailed description, when read with the accompanying FIGUREs. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which:

FIG. 11B shows a measured bit-error rate versus the received optical power in the fiber just before reaching the grating, for device depicted in FIG. 11A.

DETAILED DESCRIPTION

It can be more space- and cost-efficient if diplexers and triplexers are manufactured as part of the planar photonic integrated circuits (PICs). For example, a standard optical fiber whose end is above the surface of the PIC and oriented substantially normal to the PIC could send or receive optical signals to and from the PIC. Two-dimensional grating couplers can allow an optical fiber to be so-coupled to a PIC.

Although an optical fiber can be about vertically coupled to a grating coupler located on the surface of a PIC, it may be difficult to simultaneously couple two widely different wavelengths of light to the same grating coupler. For instance, to simultaneously couple 1300 nm and 1500 nm wavelengths of light, with phase matching for both wavelengths, the optical fiber usually has to be tilted a large incident angle away (e.g., more than about ±15 degrees) from an angle that is normal to the PIC's surface. This, in turn, can result in highly polarization-dependent losses, and, result in logistical problems, such as maintaining the optical fiber at the desired tilt angle.

Various optical couplers disclosed herein provide a two-dimensional (2D) grating and optical waveguides which are arranged to permit a light to be transmitted substantially vertically into the 2D grating (e.g., via an end of an optical fiber) and then for the light to exit the grating into ends of optical waveguides that are substantially non-parallel (e.g., diagonal) to the primitive lattice vectors of the 2D lattice whose nodes are the locations of the light-refractive structures of the grating. In some embodiments, such an optical coupler c a n be further configured to enable the simultaneous direction of a second different wavelength of light into the 2D grating f r o m another waveguide aligned in a direction that is substantially parallel to the plane of the light-refractive structures of the 2D grating. The second light can exit the grating vertically, e.g., along about the same trajectory, e.g., nearly normally to the PIC, that the first light was propagated along. As a result, a single optical coupler can couple incoming optical signals on one carrier wavelength of light and out-going optical signals on a very different second carrier wavelength of light, without having to tilt the orientation of the coupling optical fiber far away from the normal to a surface of the PIC.

Figure 1:
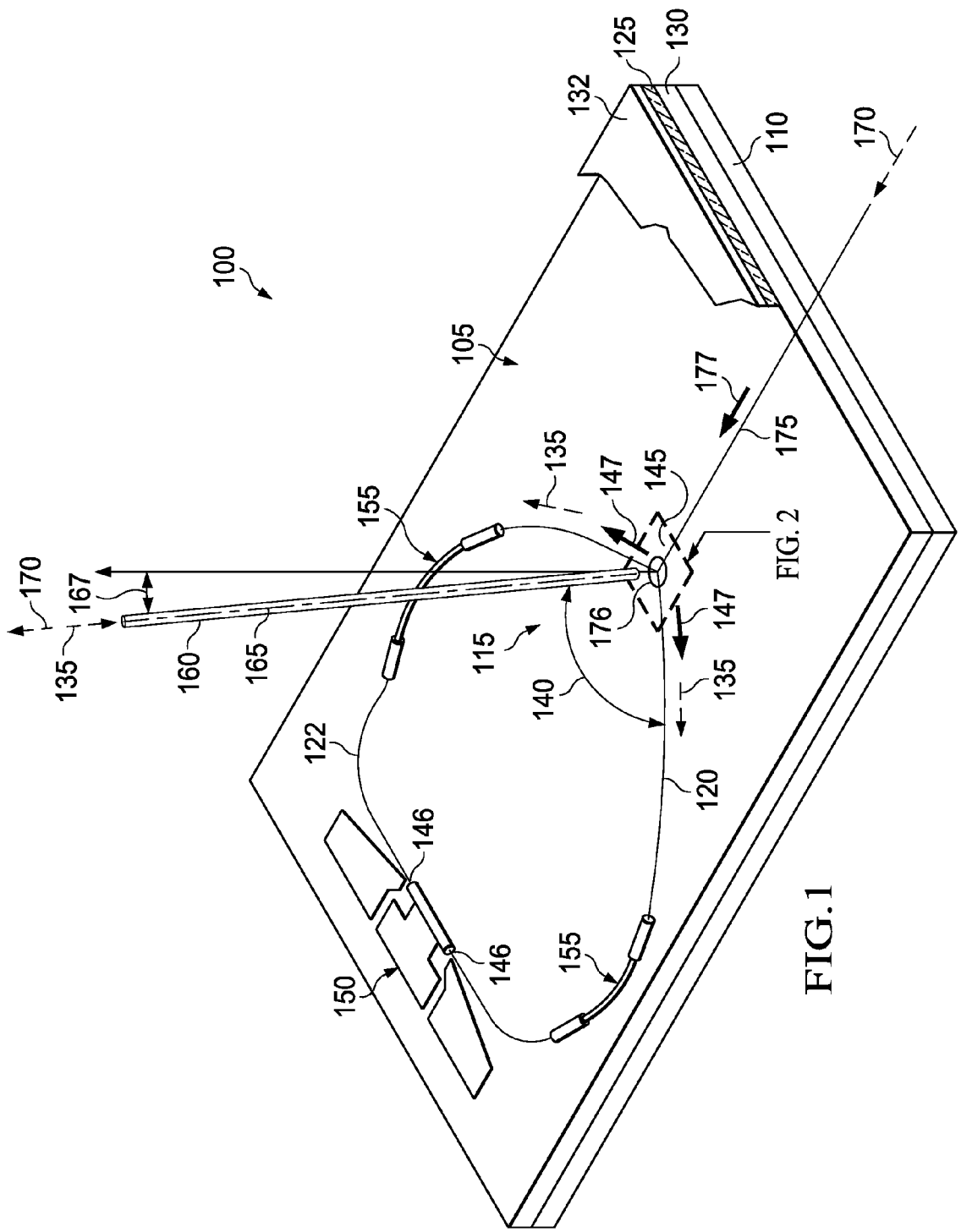
FIG. 1 presents a perspective view of an example optical device.
Figure 2:
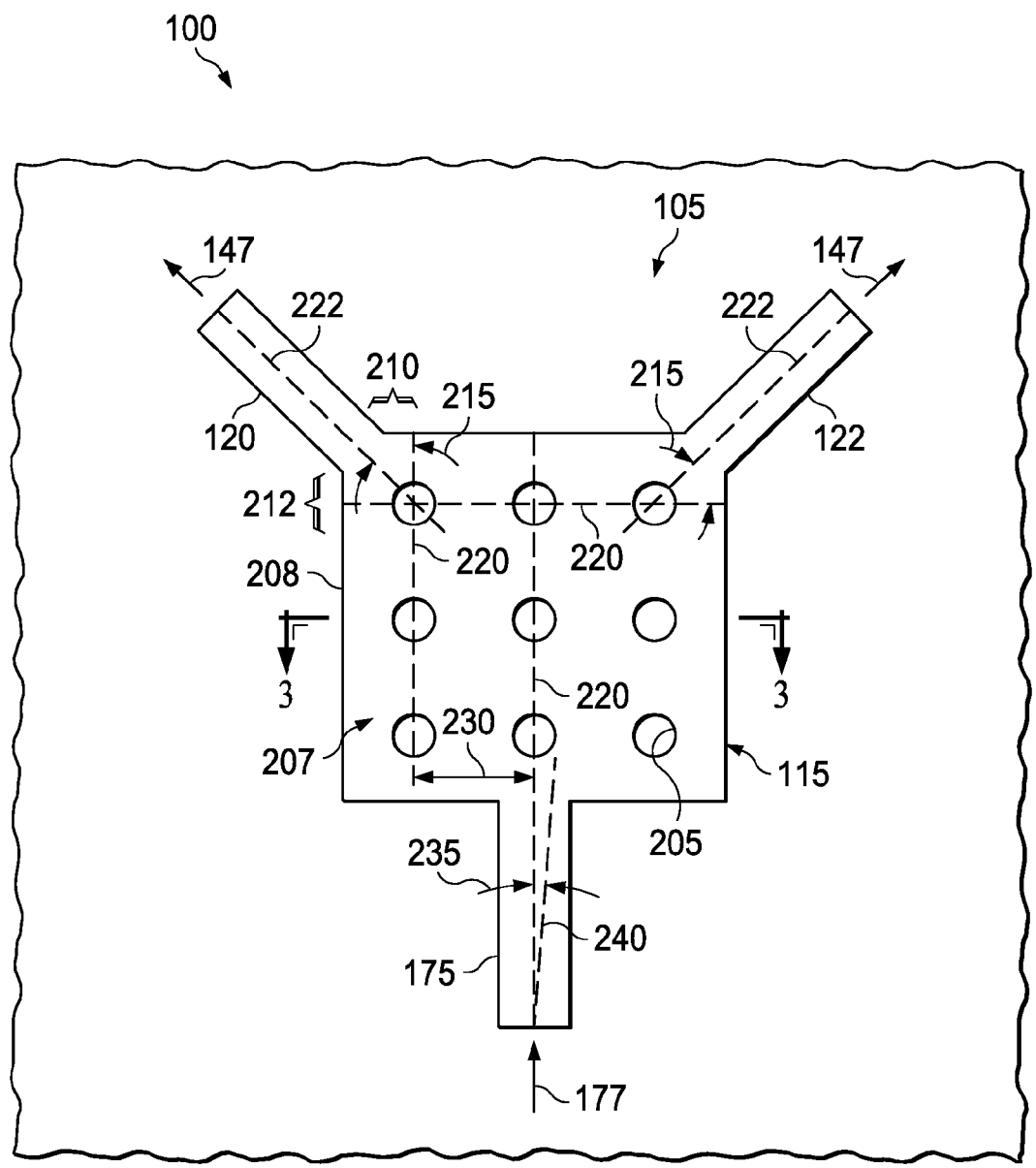
FIG. 2 presents a detailed plan view of a portion of the example device shown in FIG. 1.
Figure 3:
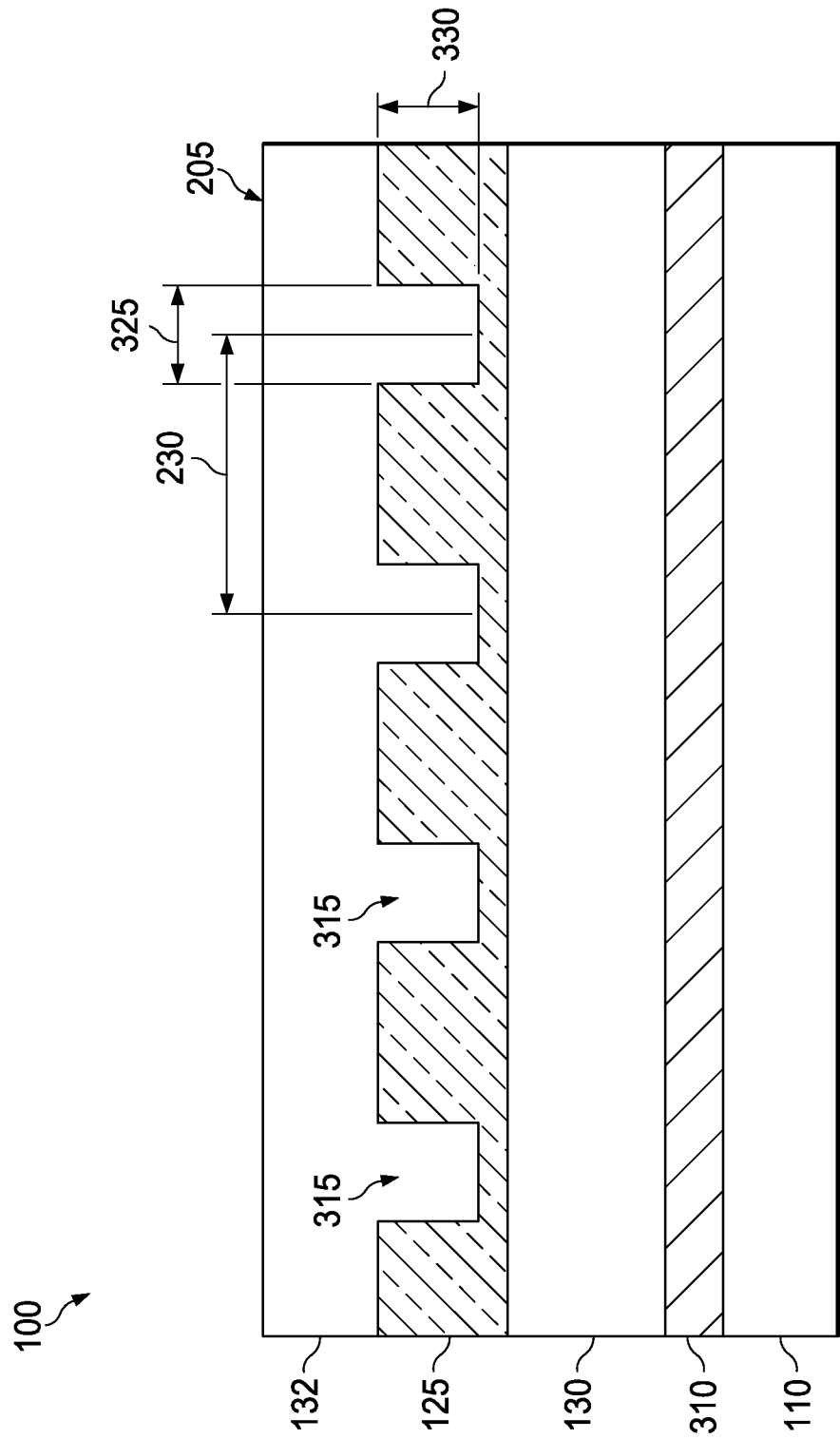
FIG. 3 presents a cross-sectional view of a portion of the example device shown in FIG. 1.

One embodiment of the disclosure is an optical device. FIG. 1 presents a perspective view of an example optical device 100. In some embodiments the optical device is configured as a diplexer PIC or as a triplexor PIC. FIG. 2 presents a plan view of a portion of an example device, such as the example device shown in FIG. 1, corresponding to view 2 shown in FIG. 1. FIG. 3 presents a cross-sectional view of a portion of an example device, such as the example device shown in FIG. 1, along view line 3-3 shown in FIG. 2.

As shown in FIG. 1, the example optical device 100 comprises an optical coupler 105 (e.g., planar optical coupler) located on a planar substrate 110 (e.g., along a planar surface 111 of a substrate 110). The optical coupler includes a two-dimensional grating 115 and one or more waveguides 120, 122. Both the two-dimensional grating 115 and one or more waveguides 120, 122 are located in an optical core layer 125 on the planar substrate 110. The term optical core layer as used herein refers to a crystalline, polycrystalline, or amorphous layer having a higher refractive index than its surrounding material. For instance, in some embodiments such as shown in FIG. 1, a silicon optical core layer 125 can be adjacent to upper or lower cladding layers 130, 132 of silicon oxide (for clarity, the upper cladding layer 132 is only partially depicted).

Herein, a two-dimensional grating is a planar structure formed by a distribution of similarly shaped diffractive structures at nodes of a regular 2D lattice. One of the diffractive structures is located at each node of the regular 2D lattice if the node is located in a selected laterally bounded region. The regular 2D lattice may be unchirped so that its nodes have about equal spacings, or the regular 2D lattice may be chirped so that the spacings of its nodes are chirped alone one direction, e.g., to grow linearly along the direction. The regular 2D lattice may have various local symmetry types, e.g., a 2D square lattice, a 2D rectangular lattice, a 2D parallelogram lattice or a linearly chirped variation of any of these specific lattices.

In the case of equally spaced nodes, the location vector, L, for each node of a regular 2D lattice may be written as: $L = N \cdot A + M \cdot B$ where N and M are integers and A and B are non-parallel primitive lattice vectors. Herein, for such a 2D lattice, the primitive lattice vectors are two shortest lattice vectors that can be used to define the locations of the nodes of the lattice. For example, the primitive lattice vectors of a square lattice are orthogonal.

As further shown in FIG. 1, the two-dimensional grating 115 is configured to receive or transmit (or both receive and transmit) a light 135 that travels in a direction that is at an angle 140 that is substantially normal to the planar substrate 105. In some cases the angle 140 90±15 degrees. One end 145 of the one or more waveguides 120, 122 is optically coupled to the two-dimensional grating 115. In some cases, the other opposite end 146 of each of the one or more waveguides 120, 122 is optically coupled to a photodiode 150 integrated in the device 100. In some cases, the device 100 includes optical filters 155 (e.g., Mach-Zehnder interferometer filters) that are optically coupled to the waveguide 120, 132, e.g., the filters 155 can be included in the light-guiding path of the one or more waveguides 120, 122.

As shown in FIGS. 2 and 3, the 2D grating 115 includes a 2D pattern of substantially similar light-refractive structures 205. One of the light-refractive structures 205 is locate at each node of a regular 2D lattice 207, which is located in a laterally bounded region 208, e.g., a square for the illustrated 2D grating. The term light-refractive structure 205 as used herein refers to openings in, or raised features on, a portion the optical core layer 125 that the light 135 (FIG. 1) is directed to.

Due to their location at the nodes of a regular 2D lattice, the light-refractive structures 205 form columns 210 and rows 212, wherein the columns 210 are oriented to be parallel to a first primitive lattice vector, and the row are are oriented to be parallel to a second primitive lattice vector that is not parallel to the first primitive lattice vector. In the illustrated embodiment, the 2D grating 115 is a square-shaped lateral region of a square lattice that includes refractive structures 205 at 20 lattice nodes along the direction of each primitive lattice vector of the square lattice.

The light-refractive structures 205 can be aligned with each other in columns 210 and rows 212, e.g., a repeating numbers of columns and rows. In some embodiments, the grating 115 comprises a 20-by-20 square lattice of refractive structures 205. The end 145 (FIG. 1) of each of the one or more waveguides 120, 122 is optically coupled to the two-dimensional grating 115 such that a direction 147 of the light's 135 propagation through the waveguides 120, 122 would be substantially non-parallel to the rows and columns 210, 212, i.e., non-parallel to the primitive lattice vectors for the regular 2D lattice underlying the locations of the refractive structures 205 of the 2D grating 115.

For the purposes of the present disclosure, the condition of the direction 147 of light propagation being substantially non-parallel to the primitive lattice vectors (e.g., in some cases the rows 210 and columns 212 depicted in FIG. 2) is met when there is an angle of intersection 215 of about ±10 degrees or greater between straight lines of directions 220 through the primitive lattice vectors (e.g., in some cases the rows 210 and columns 212) and straight lines of directions of light propagation 222, 224 through the one or more waveguides 120, 122.

As illustrated in FIG. 3, in some embodiments the optical coupler can further include a reflective structure 310 (e.g., a planar reflective structure) located under the two-dimensional grating 115. The reflective structure can improve the efficiency of light transmission through the grating 115, e.g., by reflecting light 135 transmitted through the grating 115 that would otherwise be lost due to light scattering into the substrate 110, back into the grating 115. In some cases, reflective structure can be a metal layer, such as a gold or silver layer. In other cases, the reflective structure 310 can be a distributed brag reflector (e.g., planar distributed brag reflector).

In some cases, such as shown in FIGS. 1 and 2, embodiments of the device 100 two waveguides 120, 122 are both optically coupled to two-dimensional grating 115 such that the directions 147 of the light's 135 propagation through the waveguides 120, 122 are substantially non-parallel with directions of the primitive lattice vectors of the 2D grating 115 (e.g., corresponding to the rows or columns 210, 212), and, the directions 147 along the lines 222, 224 through the two waveguides 120, 122 (e.g., centers of the waveguides) are substantially orthogonal (e.g., 90±10 degrees) to each other. In the example illustrated in FIG. 2, the angle of intersection 215 can be about 45 degrees with respect to both the rows and columns 210, 212. Based on the present disclosure, however, one skilled in the art would understand how 2D lattice of nodes upon which adjacent light-refractive structures 205 are located could be adjusted to achieve different angles of intersection 215, if desired. Such adjustments could include, e.g., changes in the size of light-refractive structures 205 and separation between adjacent light-refractive structures 205.

In some embodiments, one of the waveguides 120 carries a first polarized portion of the light 135 and another one of the waveguides 122 carries a different second polarized portion of light 135. In some cases, the first and second polarized portions through the respective waveguides 120, 122 are both transverse electric modes (TE) of the light 135, or both transverse magnetic modes (TM) of the light 135, and, they are in orthogonal polarization states with respect to each other. The light 135 can be separately directed by each one of the two waveguides 120, 122 to different ends of the photodiode 150 of the device 100. Optical signals carried by the light 135 are converted in the photodiode 150 to electronic signals. The electronic signals can be sent to electric components (not shown) of the device 100, e.g., trans-impedance amplifiers and electronic integrated circuits, to facilitate further processing of the electrical signals.

As further illustrated in FIG. 1, the optical device 100 can further include an optical fiber 160 located above the planar substrate 110 (e.g., above the plane of the substrate). In other embodiments, however, the light 135 can be transmitted via other light sources, such as lasers or lens, to the grating 135. In some cases, the optical fiber 160 can be configured to pass the light 135 to or from (or both to and from) the two-dimensional grating 115. In some cases, a long axis 165 of the fiber 160 is oriented at the angle 140 substantially normal to the substrate 110. E.g., the long axis 165 can be aligned to within about ±15 degrees with the normal vector to the planar surface of the planar substrate 110. In some embodiments, the optical fiber 160 is tilted by a non-zero incident angle 167 off a normal angle 140 to the planar substrate 110. For instance, having an incident tilt angle 167 in the range of about 2 to 10 degrees off the normal angle 140 can advantageously reduce losses of the light 135 due to light reflection. As further explained below, the non-zero incident tilt angle 167 off the normal angle 140 can also be adjusted to facilitate two particular wavelengths of different light to be passed through the grating 115, with phase matching at both wavelengths.

The particular center-to-center distance 230 between adjacent light-refractive structures 205 of the grating 115 can be adjusted to accommodate coupling of a particular wavelength of light at the substantially non-parallel directions of light propagation 222, 224 in the one or more waveguides 120, 122. For instance, referring to the example grating 115 based on a square lattice, shown in FIGS. 1 and 2, a wavelength ($\lambda 1$) of the light 135 can equal about $a \cdot n_{eff}/\sqrt{2}$, where a is a center-to-center distance 230 between adjacent ones of the light-refractive structures 205 in a given column or row 210, 212 of the light-refractive structures 205 and $n_{eff}$ is an effective refractive index of two-dimensional grating 115. E.g., a is the lattice spacing for the square lattice of the illustrated 2D grating 115. One skilled in the art would understand how to calculate the $n_{eff}$, e.g., by numerically solving the Eigenmodes of the grating's 115 lattice structure to calculate the propagation constant and thereby calculate $n_{eff}$. Accordingly, to transmit a particular wavelength ($\lambda 1$) of light 135 through the optical device 100, the grating 115 can be constructed such that the value of a satisfies the condition: $\lambda 1 \cdot \sqrt{2}/n_{eff}$ (e.g., $a = \lambda 1 \cdot \sqrt{2}/n_{eff}$). As an example, consider when the optical core layer 125 comprises crystalline silicon, and, the grating 115 therein has an effective refractive index ($n_{eff}$) of 2.9. To transmit a 1.27 micron wavelength ($\lambda 1$) of light 135, a preferably equals about 0.62 microns.

In some cases, the center-to-center distance 230 (e.g., the lattice spacing, a) is the same for all of the light-refractive structures 205 that are aligned in the same row 212. In some cases, the same center-to-center distance 230 is present between adjacent rows 212. E.g., the center-to-center distance 230 is the same between adjacent light-refractive structures 205 in the same column 210. In other cases, however, there can be a successive continuous change in center-to-center distances between light-refractive structures 205 in adjacent rows 212. E.g., the continuous change in center-to-center distance 230 between rows 212 can be defined by apodization functions (e.g., linearly chirped or otherwise) well known to those skilled in the art.

As also illustrated, in FIG. 1, in some embodiments, the two-dimensional grating 115 can be further configured to transmit or receive a second light 170. The transmission or receipt of the second light 170 through the grating 115 can occur simultaneous with transmission or receipt of the first light 135, such as described above.

The second light 170 can be propagated through another waveguide 175 in the optical core layer 125. An end 176 of the other waveguide 175 is optically coupled to the two-dimensional grating 115. In contrast to the above-described waveguides 120, 122, the other waveguide 175 is optically coupled to the two-dimensional grating 115 such that a direction 177 of the second light's 170 propagation through the other waveguide 175, or, near the end 176 of the waveguide 175, is substantially parallel with primitive lattice vectors that defines locations of nodes for the grating 115 (e.g., at least one of the rows or columns 210, 212 of the light-refractive structures 205).

The condition of the direction 177 of the second light's 170 propagation being substantially parallel to the rows or columns 210, 212 is met when there is an angle 235 of intersection equal to of less than about 10 degrees between straight lines 220 through at least one of the columns or rows 210, 212 and a straight line direction 240 of light propagation through the other waveguide 175, or, near the end 176 of the waveguide 175.

Similar to that discussed above for the first light 135, the center-to-center distance 230 between adjacent light-refractive structures 205 can be adjusted to accommodate a particular wavelength (λ2) of the second light 170. For instance, consider the square-lattice spacing for the grating 115 depicted in FIGS. 1 and 2. The wavelength (λ2) of the light 170 equals about $a \cdot n_{\textit{eff}}$, where a is the center-to-center distance 230 between adjacent ones of the light-refractive structures 205 in a given column or row 210, 212, and $n_{\textit{eff}}$ is a refractive index of the cladding layer or layers 130, 132 adjacent to the optical core layer 125, including the two-dimensional grating 115. As an example, consider when the optical core layer 125, composed of silicon, has an effective refractive index ($n_{\textit{eff}}$) of 2.9. To transmit a 1.577 micron wavelength (λ2) of the second light 170 through the grating 115, a preferably equals about 0.54 microns.

In some embodiments, the second light 170 can exit the grating 115 at the angle 140 that is substantially normal to the plane of the substrate 110. For instance, the light 135, having a first wavelength, can be transmitted to the two-dimensional grating 115 through the optical fiber 160 located above the planar substrate 110, and the second light 170, having a different second wavelength, can be transmitted out of the two-dimensional grating 115 at the angle 140 and into the same optical fiber 160. In some cases, the first light 135, passing through the one or more waveguides 120, 122 also passes through optical filters 155 of the optical device 100 and the filters 155 are configured to have maximum transmission efficiency at the first wavelength and minimum transmission efficiency at the second wavelength of the second light 170.

Alternatively, in other embodiments, both the first light 135 and the second light 170 can enter the grating 115 at the angle 140 that is substantially normal to the plane of the substrate 110, and, the first light 135 can exit the grating 115 into the one or more waveguides 120, 122, while the second light can exit the grating 115 into the other waveguide 175. One skilled in the art would understand based on the present disclosure how the lights 135, 170 could be transmitted to and from the grating 115, in still other embodiments of the device 100.

In embodiments of the device 100 using lights 135, 170 of two different wavelengths, it can be advantageous to cooperably adjust both the center-to-center distance 230 (e.g., the lattice spacing, a) and the substantially normal angle 140 to accommodate two particular wavelengths of the light 135 and the second light 170. For instance, the center-to-center distance 230 and the angle 140 can have values that simultaneously satisfy the relationships:

$$k_{out,X} = k_{in,X}\sin\theta + \frac{2\pi}{a},$$

where $k_{in,X}=2\pi n_{cl}/(\lambda 2)$ and $k_{out,X}=2\pi n_{\textit{eff}}/(\lambda 2)$, and $$k_{out,M}^2 = \left(\frac{2\pi}{a}\right)^2 + \left(\frac{2\pi}{a} - k_{in,M}\sin\theta\right)^2,$$

where $k_{in,M}=2\pi n_{cl}/(\lambda 1)$ and $k_{out,M}=2\pi n_{\textit{eff}}/(\lambda 1)$, and, where λ1 is the first wavelength of the light 135, λ2 is the second wavelength of the second light 170, and θ is the incident angle 167 away from the angle 140 that is substantially normal to the planar substrate 110. Continuing with the same examples, consider the case when the optical core layer 125 and cladding layers 130, 132 are composed of silicon and silicon oxide, respectively, and λ1 and λ2 are equal to about 1.27 and 1.577 microns, respectively. In such cases, preferably, a equals about 0.59 microns and θ equals about 8.7 degrees (e.g., the angle 140 equals about 91.3 degrees).

In some embodiments, such as depicted in FIG. 3, the light refractive structures 205 can include, or be, holes 315 (e.g., shaped and sized holes) in the optical core layer 125. Adjacent ones of the holes 315 in a same row 212 can have a same center-to-center separation distance 230. In some embodiments, at least one lateral dimension 325 of the holes 315 (e.g., a width or length of a square hole) equals about one-half of the separation distance 230. E.g., when the center-to-center separation distance 230 equals about 0.6 microns, the lateral dimension 325 equals about 0.3 microns. In some embodiments, the each of the holes 315 has a same depth 330 of about 0.090 microns. Alternatively, in other embodiments, the light refractive structures 205 can include or be posts (not shown) formed from the optical core layer 125. The posts can have dimensions similar to the above-described holes 315.

In some embodiments of the device 100 such as shown in FIGS. 1 and 2, the optical device 100 comprises a substrate 110 having a planar surface 111 and having an optical core 125 thereon. The device 100 also comprises a two-dimensional grating 115 located in the optical core 125, said two-dimensional grating 115 being formed by a regular two-dimensional pattern of light-refractive structures 205, one of said light-refractive structures 205 being located at each node of a regular 2D lattice 207 located in a laterally bounded region 208. The device 100 also comprises first and second optical waveguides 170, 120 being on the planar substrate and having ends 176, 145 end-coupled to the two-dimensional grating, the first optical waveguide 170 being such that a direction 177 of propagation near the end 176 thereof is substantially along a primitive lattice vector (e.g., columns 210, rows 212) of said 2D lattice, the second optical waveguide 120 being such that a direction 147 of propagation near the end 145 thereof is not-parallel to a primitive lattice vector (e.g., columns 210, rows 212) of the regular 2D lattice 207.

In some embodiments of the device 100 such as shown in FIGS. 1 and 2, the optical device 100 comprises a substrate 110 having a planar surface 111 and having an optical core 125 thereon. The device 100 also comprises a two-dimensional grating 115 located in the optical core 125, said two-dimensional grating 115 being formed by a regular two-dimensional pattern of light-refractive structures 205, one of said light-refractive structures 205 being located at each node of a regular 2D lattice 207 located in a laterally bounded region 208. The device also comprises one or more optical waveguides 120, 122 being on the planar substrate 110 and having ends 145 end-coupled to the two-dimensional grating 115. The one or more optical waveguide 120, 122 are such that a direction of propagation 147 near said end 145 thereof is substantially along a non-primitive lattice vector of the regular 2D lattice 207. In some embodiments, e.g., the direction 147 of the light's 135 propagation through the one or more waveguides 120, 122 is substantially parallel to a non-primitive lattice vector of the regular 2D lattice 207 (e.g., substantially parallel to diagonally aligned light-refractive structures 205 from adjacent columns 210 or rows 212, or, non-parallel to the rows and the columns 210, 212).

In some embodiments of the device 100 such as shown in FIGS. 1 and 2, the device 100 comprises an optical coupler 105 located on a planar substrate 110. The optical coupler 105 includes a two-dimensional grating 115 and one or more waveguides 120, 122 both in an optical core layer 125 on the planar substrate 110. The two-dimensional grating 115 includes a periodic arrangement of light-refractive structures 205, the light-refractive structures 205 being aligned with each other in columns and rows 210, 212. The two-dimensional grating 115 is configured to receive or transmit a light 135 at an angle 140 that is substantially normal to the planar substrate 110. One end 145 of each of the one or more waveguides 120, 122 is optically coupled to the two-dimensional grating 115 such that a direction of the light's 135 propagation 147 through the one or more waveguides 120, 122 would be substantially non-parallel to the rows and the columns 210, 212.

Figure 4:
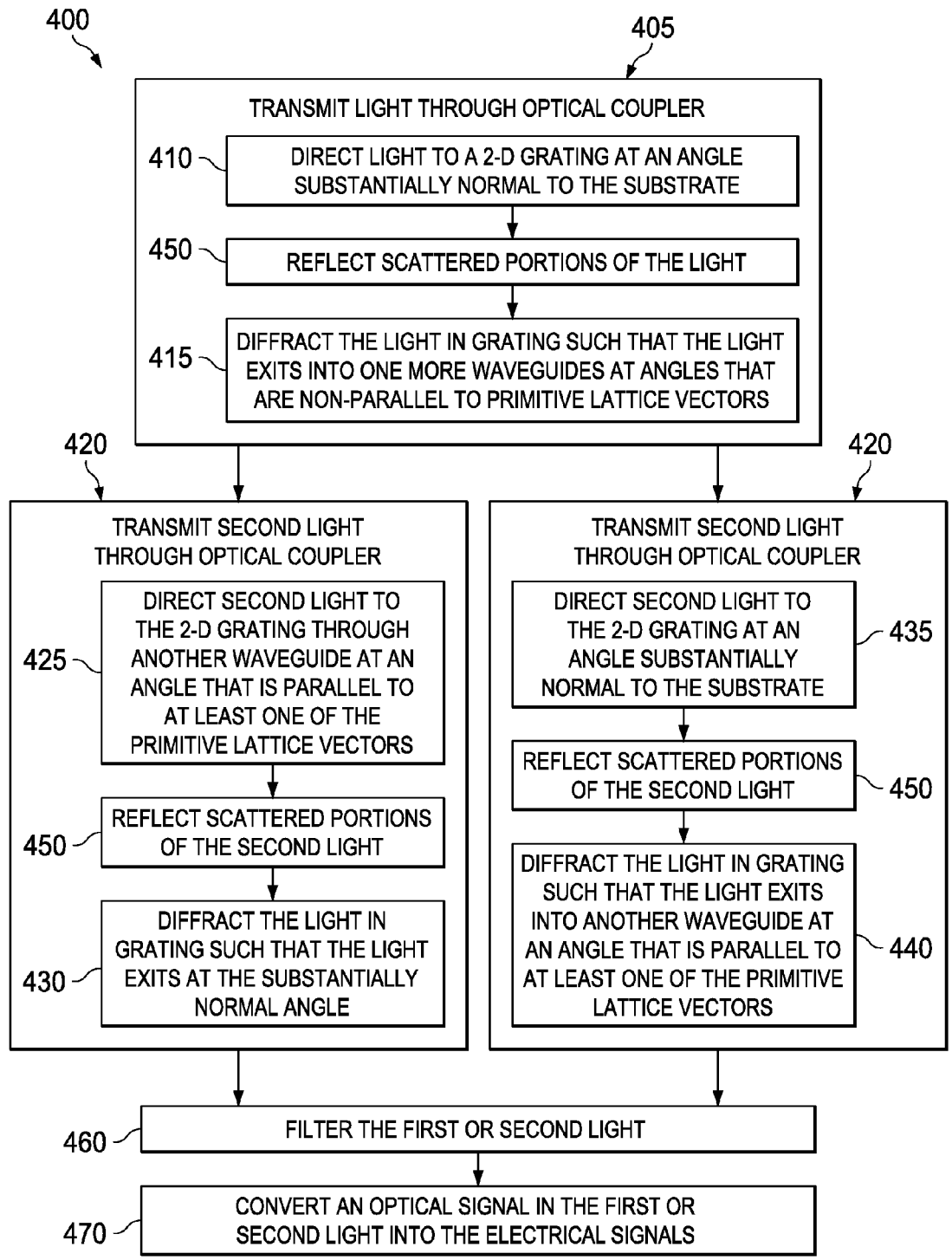
FIG. 4 presents a flow diagram of an example method of using an optical device, such as the devices depicted in FIGS. 1-3.

Another embodiment is a method of using the above-described optical devices. FIG. 4 presents a flow diagram showing selected steps of an example method 400 of using an example optical device such as the optical devices 100 discussed in the context of FIGS. 1-3.

As shown in FIG. 4, with continuing reference to FIGS. 1-3, the method 400 comprises a step 405 of transmitting a light 135 through an optical coupler 105. Transmitting the light 135 in step 405 can include a step 410 of directing the light 135 towards a two-dimensional grating 115 in an optical core layer 125. The light 135 is directed in step 410 at an angle 140 that is substantially normal to a planar substrate 110 that the optical core layer 125 is located on. E.g., light is transmitted along a direction at an angle 140 that is substantially normal the planar substrate 110. Step 410 can include adjusting the angle 140 by an incident tilt angle 167 to facilitate the transmission of particular wavelengths of light 135, 170, such discussed above. In some cases, the light 135 can be transmitted via an optical fiber 160, where at least a portion of the fiber 160 has its long axis 165 aligned with the angle 140. Or, other light sources such as lasers or lenses can direct the light 130 in a direction at the angle 140. As discussed above, the two-dimensional grating 115 includes a pattern of light-refractive structures 205 located at the nodes of a laterally bounded portion of a regular 2D lattice. E.g., the light-refractive structures 205 can be located so as to form columns and rows 210, 212 of light-refractive structures 205. As also discussed the rows 210, 212 can be aligned in non-parallel directions to the primitive lattice vectors of the gratings 115.

Transmitting the light 135 in step 405 can include a step 415 of diffracting the light 135 in the two-dimensional grating 115 such that the light 135 exits the two-dimensional grating 115 into one or more waveguides 120, 122 in the optical core layer 125. One end 145 of each of the waveguides 120, 122 is optically coupled to the two-dimensional grating 115 such that a direction 147 of the light's 135 propagation in or through the waveguides 120, 122, including near the waveguide's ends 147, is substantially non-parallel to primitive lattice vectors (e.g., in some cases, either the rows or columns 210, 212).

In some embodiments, the propagation direction of the light 135 is reversed. E.g., light 135 enters the two-dimensional grating 115 from the one or more waveguides 120, 122, and, the light 135 exits the grating 115 at the substantially normal angle 140.

In some embodiments, the method 400 further comprises a step 420 of transmitting a second light 170 through the optical coupler 105, wherein the second light 170 has a different wavelength than the light 135.

In some embodiments, transmitting the second light 170 in step 420 can include a step 425 of directing the second light 170 to the two-dimensional grating 115 by passing the second light 170 through another waveguide 175 in the optical core layer 125. An end 175 of the other waveguide 175 is optically coupled to grating 115 at an angle 235 such that a direction 177 of the second light's 170 propagation in or through the other waveguide 175, including near the waveguide's end 176, is substantially parallel with the primitive lattice vectors (e.g., in some cases, at least one of the rows or columns 210, 212). Transmitting the second light 170 in step 420 can also include a step 430 of diffracting the second light 170 in the grating 115 such that the second light 170 exits the two-dimensional grating at the substantially normal angle 140. For instance, the second light 170 can exit the grating 115 out and above the plane of the substrate, along the angle 140 into an optical fiber 160, at least a portion of which, has its long axis 165 along at the substantially normal angle.

In other embodiments, transmitting the second light 170 in step 420 can alternatively include a step 435 of directing the second light 170 to the two-dimensional grating 115, the second light 170 being directed at the substantially normal angle 140. For instance, the second light 170 can be directed down the same optical fiber 160 to the grating 115 that the first light 135 is directed down. Transmitting the second light 170 in step 420 can also include a step 440 of diffracting the second light 170 in the grating 115 such that the second light 170 exits the two-dimensional grating through the above-described other waveguide 175 in a direction that is at an angle 235 that is substantially parallel to the primitive lattice vectors of the lattice defining the locations of the nodes of the grating 115 (e.g., in some cases, parallel to at least one of the columns or rows 210, 212 of light reflective structures 205).

In some embodiments, the method 400 can further include the step 450 of reflecting a portion of the diffracted light (e.g., the light directed in step 410) that is scattered below the optical core layer 125 using a reflective structure 310 located on the planar substrate 110 and below optical core layer 125.

In some embodiments, method 400 further includes a step 460 of filtering the light 135 directed into the one or more waveguides 120, 122. For instance the light 135 can be passed through one or more optical filters 155 having a maximum transmission efficiency for a wavelength of the light 130 and a minimum transmission efficiency for a different wavelength of the second light 170.

In some embodiments the method 400 can include a step 470 of converting an optical signal carried by the light 130 into an electrical signal. For instance, the conversion step 470 can be facilitated by passing the light 130 from the waveguides 120, 122 to a photodiode 150 optically coupled to the waveguides 120, 122.

Based on the present disclosure, one skilled in the art would understand, as further illustrated in FIG. 4, that the second light 170 could also be reflected, filtered and converted in accordance to steps 450, 460 and 470, respectively.

In some embodiments, the method 400 comprises transmitting a light 135 through an optical coupler 105 (step 405). Transmitting the light 135 through the optical coupler 105 (step 405) includes directing the light 135 towards the above-described two-dimensional grating 115 in an optical core layer 125 (step 410). The light 140 is directed at an angle 140 that is substantially normal to a planar substrate 110 that the optical core layer 125 is located on. Transmitting the light 135 through the optical coupler 105 (step 405) also includes diffracting (step 415) the light 135 in the two-dimensional grating 115 such that the light 115 exits the two-dimensional grating 115 into the one or more waveguides 120, 122 that are optically coupled to the two-dimensional grating 115 as described above, such that a direction of the light's 135 propagation through the one or more waveguides 120, 122 is substantially non-parallel to either the rows or the columns 210, 212.

Figure 5:
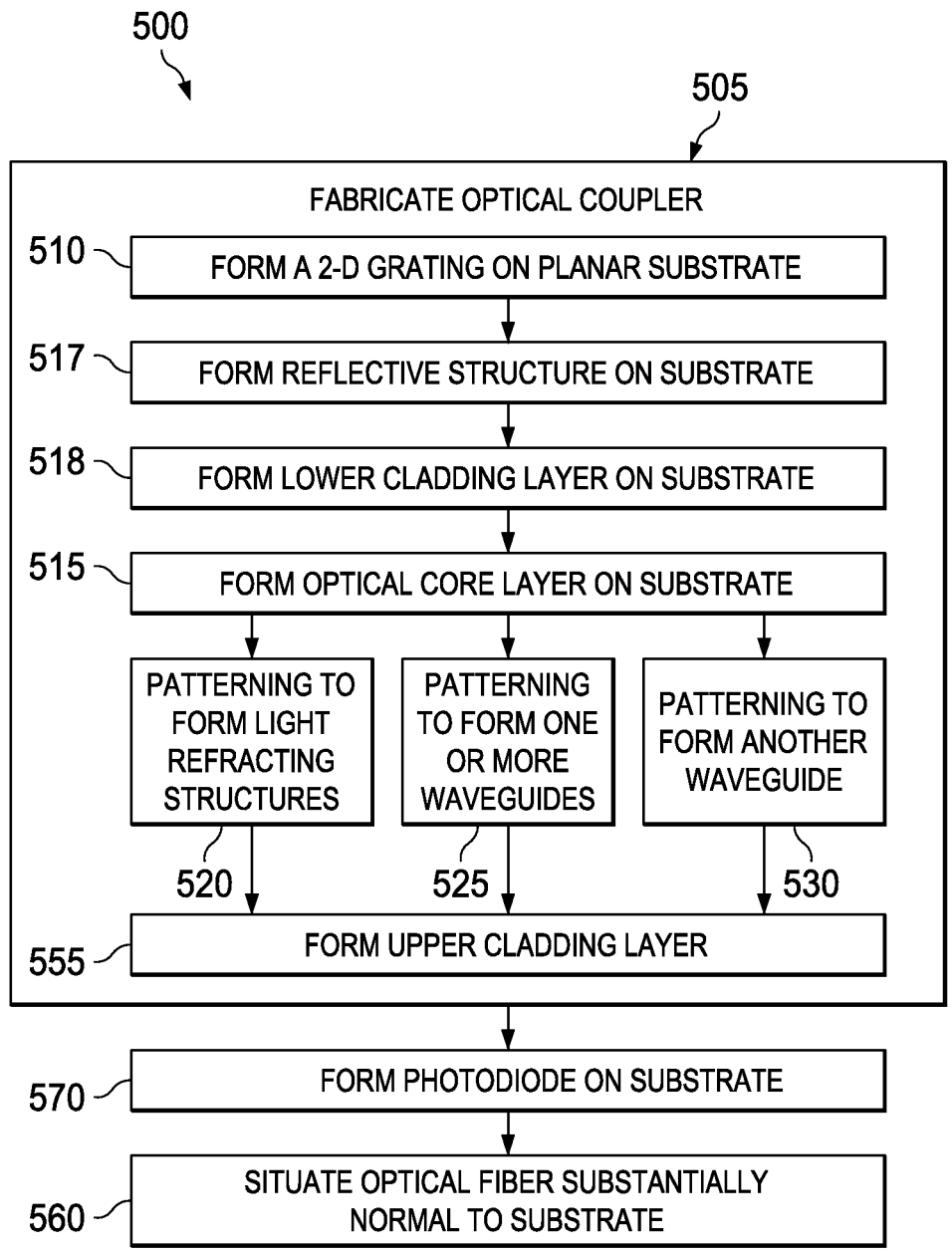
FIG. 5 presents a flow diagram of an example method of manufacturing an optical device, such the devices as depicted in FIGS. 1-3.

Another embodiment is a method of manufacturing the optical device. FIG. 5 presents a flow diagram showing selected steps of an example method 500 of manufacture an optical device such as the optical devices 100 discussed in the context of FIGS. 1-3.

With continuing reference to FIGS. 1-3, the method 500 comprises a step 505 of fabricating an optical coupler 105 on a planar substrate 110. Fabricating the optical coupler 105 in step 505 can include a step 510 of forming a two-dimensional grating 115. Forming a two-dimensional grating 115 in step 510, in turn, can include a step 515 forming an optical core layer 125 on the substrate 110. For instance, in some embodiments, a crystalline material layer such as mono-crystalline silicon can be bonded to the substrate 110 in step 515.

In some cases, prior to forming the optical core layer 125 in step 515, a reflective structure 310 is formed on the substrate 110 in step 517. As part of step 517, e.g., a metal layer can be bonded to the substrate 110 or layers of materials having different refractive indexes can be bonded, grown or deposited on the substrate 110 to form a distributed brag reflector In some cases, prior to forming the optical core layer 125 in step 515, a lower cladding layer 130 is formed on the substrate 110 in step 518. E.g., in some cases a silicon oxide cladding layer 130 is thermally grown on the silicon substrate 110, or, in some cases, the cladding layer 130 formed directly on the reflective structure 310.

Forming a two-dimensional grating 115 in step 510 also include a step 520 of patterning the optical core layer 125 to form an arrangement of light-refractive structures 205 (e.g., a regular 2D arrangement). For instance, standard photolithography and etching procedures can be conducted as part of step 520 to form raised features (e.g., posts) or holes in the optical core layer 125 to form the light-refractive structures 205 that are aligned with each other to form columns 210 and rows 212 of the light-refractive structures 205. In some cases, the rows 212 are relatively non-parallel to the columns 210. For instance, the patterning step 520 can include etching holes 315 in the optical core layer 125. Each of the holes 315 can comprise individual ones of the light-refractive structures 215. Adjacent ones of the holes 315 in the same row 212 can have a same separation distance 320, and at least one lateral dimension 325 of the holes can be equal to about one-half of the separation distance 320.

Fabricating the optical coupler 105 in step 505 can also includes a step 525 of patterning the optical core layer 125 to form one or more waveguides 120, 122. As discussed above, one end 145 of each of the waveguides 120, 122 is optically coupled to the two-dimensional grating 115 (e.g., end coupled) such that a direction of light 130 propagation in or through the waveguides 120, 122, including near the waveguides ends 145, would be substantially non-parallel with primitive lattice vectors defining the lattice of the 2D grating 115 (e.g., in some cases the either the rows or columns 210, 212). For instance, standard photolithography and etching procedures can be conducted as part of step 520 to form ridge waveguides 120, 122 from the optical core layer 125.

In some embodiments, fabricating the optical coupler 105 in step 505 can also include a step 530 of patterning the optical core layer 125 to form another waveguide 175 that is optically coupled to the two-dimensional grating 115 (e.g., end-coupled). The waveguide 175 is coupled to the grating 115 such that a direction 177 of a second light's 170 propagation through the other waveguide 175, including near the waveguides end 176) is substantially parallel to one of the primitive lattice vectors of the 2D grating 115 (e.g., in some cases, at least one of the rows or columns 210, 212 of light-refractive structures 205). For instance, standard photolithography and etching procedures can be conducted as part of step 530 to form a ridge waveguide 175 from the optical core layer 125.

In some cases, the same standard photolithography and etching procedures are conducted to accomplish the patterning of the grating 115, the one or more waveguides 120, 122, and the other waveguide 175, in accordance with steps 520, 525 and 530, respectively. In some cases, steps 520, 525 and 530 are conducted simultaneously.

As part of the optical coupler's fabrication (step 505), in some embodiments, after performing steps 520, 525 and 530, an upper cladding layer 132 is formed on the grating 115 in step 555, the one or more waveguides 120, 122, and the other waveguide 175. E.g., the same materials and processes as described above to form the lower cladding layer 130 in step 518 can also be used in step 555 to form the upper cladding layer 132 of silicon oxide.

In some embodiments, manufacturing the optical device 100 further includes a step 560 of situating an optical fiber 160 above the planar substrate 160 and at an angle 140 that is substantially normal to the planar substrate 160, such that the optical fiber 160 is optically coupled to the two-dimensional grating 115. E.g., a long axis 165 of at least a portion of the fiber 160 is aligned with the angle 140. In some cases, of situating an optical fiber 160 in step 560 can include tilting the fiber away from the normal angle by an incident angle 167, e.g., to facilitate the transmission of particular wavelengths of light 135, 170, such as discussed above. As discussed above, the two-dimensional grating 115 is configured to transmit or receive the light 130 propagated through the optical fiber 160.

Some embodiments of the method 500 comprises fabricating an optical coupler 105 on a planar substrate 110 (step 505). Fabricating the optical coupler 105 (step 505) includes forming a two-dimensional grating 115 (step 210), which includes forming an optical core layer 125 (step 515) on the substrate 110 and patterning the optical core layer 125 (step 520) to form a periodic arrangement of light-refractive structures 205. The light-refractive structures 205 are aligned with each other so as to form columns and rows 210, 212 of the light-refractive structures 205. Fabricating the optical coupler (step 505) also includes patterning the optical core layer 125 to form the above-described one or more waveguides 120, 122 (step 525), such that one end 145 of each of the waveguides 120, 122, is optically coupled to the two-dimensional grating 115 and a direction of light 135 propagation through the one or more waveguides 120, 122 would be substantially non-parallel with either the rows or the columns 210, 212.

One skilled in the art would be familiar with additional steps that may be need to complete the manufacture of the optical device 100. For instance, conventional procedures can be followed to form the photodiode 150 can be formed on the planar substrate in step 570.

Experiments

Further aspects of the embodiments of the disclosure are illustrated by the following experiments.

An optical device 100, configured as a diplexer PIC, was laid out substantially as depicted in FIG. 1. Test devices were fabricated on an 8 inch wafer at a commercial foundry. The waveguides 120, 122, 175 were about 220 nm thick silicon ridge waveguides on a silicon-on-insulator (SOI) substrate 110. The photodiode 150 was germanium grown directly on the silicon waveguides 120, 122 with n-doping on top in the germanium and p-doping on the sides in the silicon, similar to that described in Ref. 1. The germanium region was 8×100× 0.5 microns³. The dark current of the photodiode 150 was about 100 nA at about 1 Volt. The photodiode 150 bandwidth with an about 50 Ω load was about 5 GHz.

A 1577 nm wavelength (λ2) light 170 being transverse-electric (TE) polarized, was directed to the grating 115 from an edge facet (not shown in FIG. 1). In other embodiments of the device 100, the light 170 could come from a laser directly attached to the waveguide 175. The light 170 exited vertically into the optical fiber 160 through the grating 115. Into this same grating 115 a 1270 nm wavelength (λ1) light 135 was directed. The two orthogonal polarizations (both TE-polarized) in the fiber 160 were separated and sent to two waveguides 120, 122. Each polarization component passed through a Mach-Zehnder interferometer (MZI) filter 155, which had a null at 1577 nm and a peak at 1270 nm. The light then proceeded to the single photodiode 150, one polarization component impinging on each end of the photodiode 150, similar to that described in Ref. 2 and shown in FIG. 1.

In contrast to gratings that use only the X directions of the square lattice of the light refractive structures 205, the disclosed grating 115 uses both the X and M directions. Using both directions allows a reduction in the fiber tilt angle 167, as further illustrated below.

Figure 6:
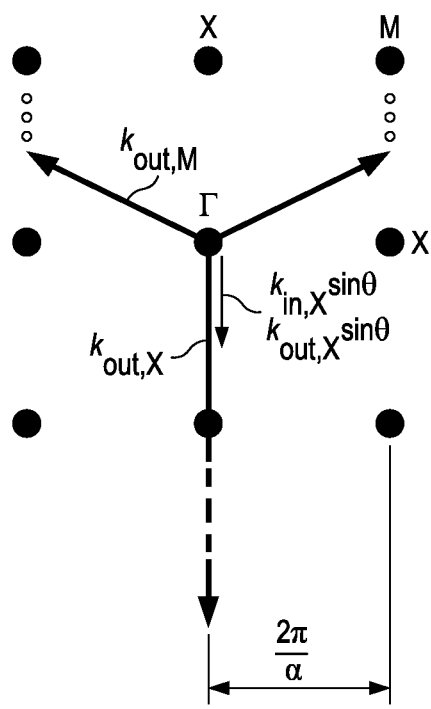
FIG. 6 shows a schematic representation light diffraction in an example grating, such as the gratings depicted in FIGS. 1-3, in the spatial frequency domain.

FIG. 6 shows a schematic representation light diffraction in an example grating (such as the grating 115 in FIG. 1) in the spatial frequency domain. From FIG. 6, the phase-matching conditions are:

$$k_{out,X} = k_{in,X} \sin\theta + \frac{2\pi}{a} \quad (1)$$

$$k_{out,M}^2 \left(\frac{2\pi}{a}\right)^2 + \left(\frac{2\pi}{a} - k_{in,M}\sin\theta\right)^2 \quad (2)$$

where k is the propagation constant for TE polarization in the material, and θ is the tilt angle 167 of the fiber from the normal along the X direction. Eq. (1) is for the 1577 nm wavelength light 170, and Eq. (2) is for the 1270 nm wavelength light 135. For example, $k_{in,X}=2\pi n_{cf}/\lambda 2$ and $k_{out,M}=2\pi n_{eff}/\lambda 1$. A positive θ corresponds to tilting the fiber 160 toward the photodiode 150. $n_{cf}=1.45$, and $n_{eff}=2.9$ for silicon dioxide and silicon, respectively. Solving Eqs. (1) and (2), gives a=0.59 μm, and θ=8.7°

As apparent from FIG. 6, the light 135 exiting the grating 115 in the M directions is slightly tilted from the Γ-M lines. Thus, the output waveguides 120, 122 for the 1270 nm light 135 signals should be rotated away from each other, as discussed in Ref 3(VI). This rotation was not incorporated into the experimental optical devices 100 presented here and thus an additional insertion loss was experienced.

The advantage of using both the X and M directions is that one can obtain phase matching for light signals with a large wavelength difference without requiring a large θ. In comparison for a design using only X directions for both wavelengths and polarizations, such as proposed in Ref. 3, one would need a=0.49 microns and θ=17.7°. Such a large tilt angle 167, however, would result in unacceptably large polarization-dependent loss, (see e.g., Refs., 4, 5), because one of the two orthogonal light polarizations in such a tilted fiber 160 (e.g., the polarization with its electric field oscillating in the plane of the tilt angle 160) has a reduced TE component as compared to the other polarization.

We used a cleaved fiber 160 to couple light vertically to the grating 115 to deliver the downstream light 135 and collect the upstream light 175, with an index-matching oil between the fiber facet and grating 115. For one test device 100, a equaled about 0.57 microns, which is different from the ideal a of 0.59 microns mentioned earlier, and thus there was no θ that satisfies Eqs. (1) and (2) simultaneously. A θ of about 2 degrees was used as a compromise. For the 1577 nm wavelength downstream light 175 we used a lensed fiber (not shown in FIG. 1) with a spot size of about 2.5 microns to couple the light 175 to the facet port.

Figure 7:
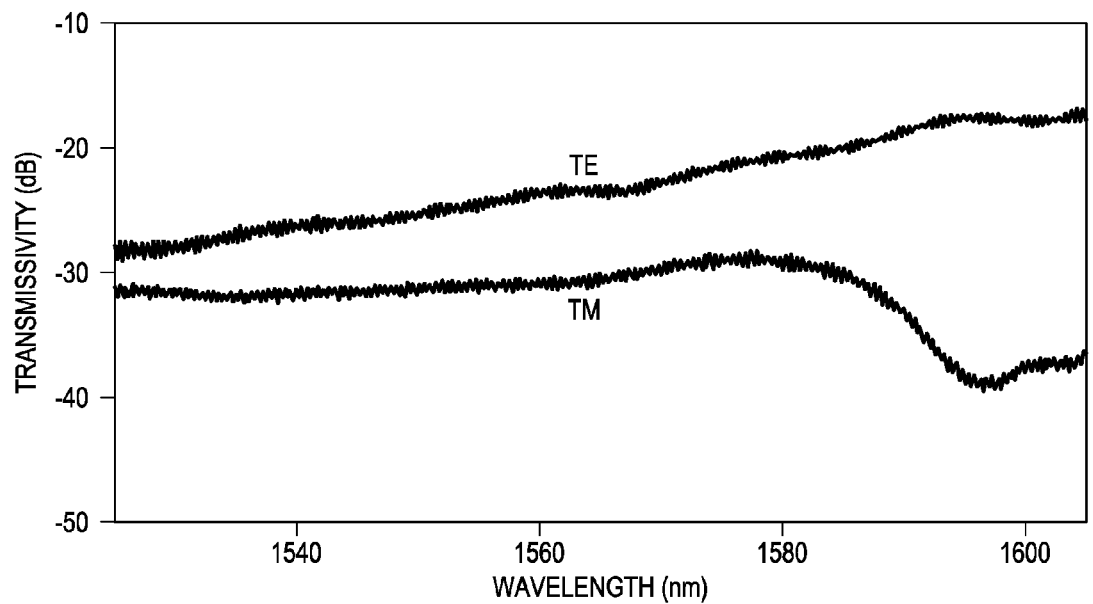
FIG. 7 shows the fiber-to-fiber transmissivity from the facet fiber to the grating fiber in the 1577 nm wavelength region for an example device, such as the devices depicted in FIGS. 1-3, with θ equal to about 2 degrees.
Figure 8:
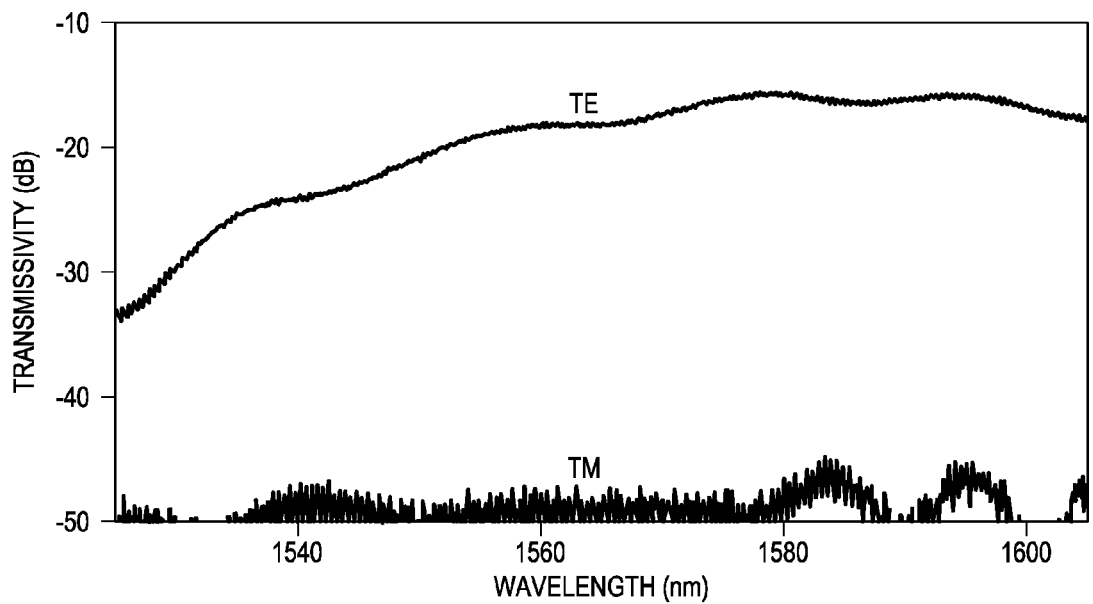
FIG. 8 shows the fiber-to-fiber transmissivity from the facet fiber to the grating fiber in the 1577 nm wavelength region for an example device, such as the devices depicted in FIGS. 1-3, with θ equal to about 5 degrees.

FIG. 7 shows the fiber-to-fiber transmissivity from the facet fiber to the grating fiber, measured in the 1577 nm wavelength region, for an example device 100 with θ equal to about 2 degrees. FIG. 7 shows the transmissivities for both TE and transverse magnetic (TM) polarizations. Because the parameters are non-optimum, the peak is not at 1577 nm. By adjusting θ to be about 5 degrees the peak was at about 1577, resulting in the transmissivity curves for this alternative example device 100, as shown in FIG. 8. The improved polarization extinction ratio in curve shown in FIG. 8 compared to FIG. 7 is likely due to the fiber 160 being tilted further from the normal, resulting in less coupling of scattered light from the ends of the grating 115, where phase-matching plays less of a role and light is generally scattered in the normal direction.

Figure 9:
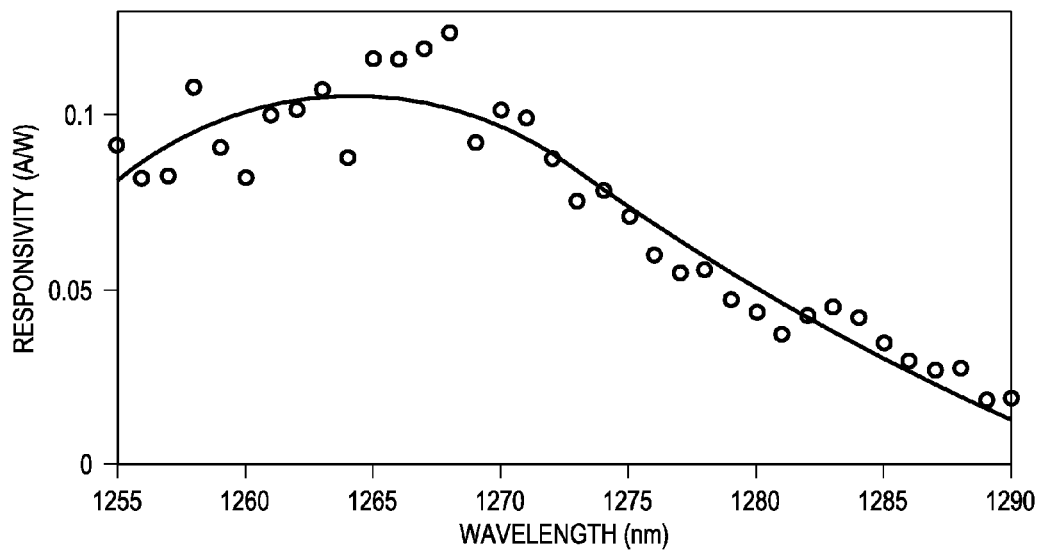
FIG. 9 shows the net responsivity from the grating to the photodiode in the 1270 nm wavelength region, for an example device, such as the devices depicted in FIGS. 1-3, with θ equal to about 2 degrees.

FIG. 9 shows the net responsivity from the grating 115 to the photodiode 150, in the 1270 nm wavelength region, for an example device 100 with θ equal to about 2 degrees. The net responsivity includes the optical fiber's 160 coupling. The peak responsivity equaled about 0.1 A/W at about 1270 nm, which corresponds to an excess loss of ~10 dB, considering that the ideal responsivity would be about 1.0 A/W. An estimated loss break down is as follows: 5.5 dB from the grating 115, 3.0 dB from the MZI filter 155, and 1.5 dB from the photodiode 150 responsivity. The test grating's 115 losses were comparable to losses using the X direction only and shows that the disclosed method of using the M direction of a grating 115 is successful.

Figure 10:
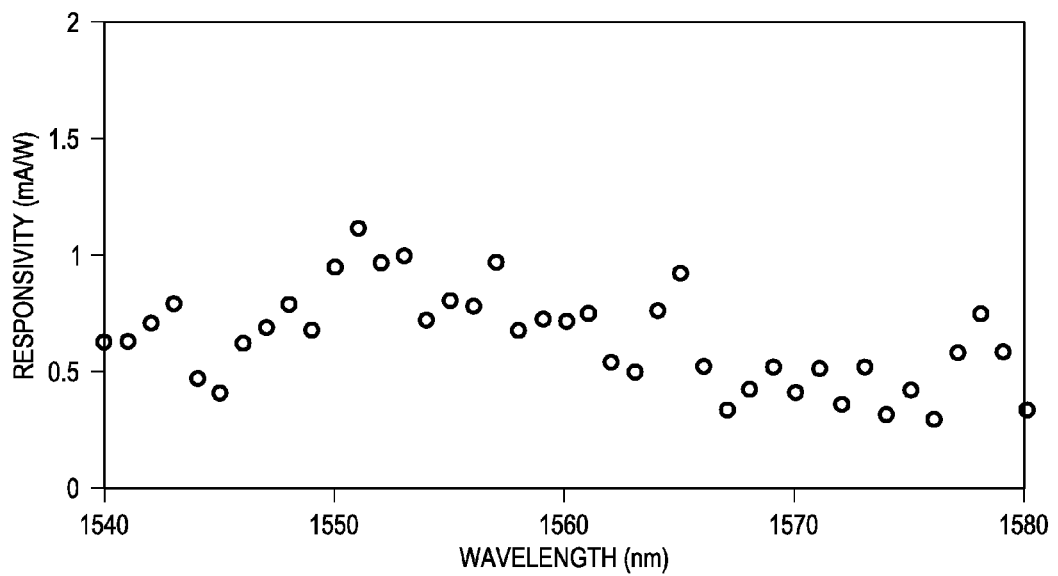
FIG. 10 shows the net responsivity of the photodiode from the facet to the photodiode in the 1577 nm wavelength region for an example device, such as the devices depicted in FIGS. 1-3, with θ equal to about 2 degrees.

The photodiode 150 response in the downstream fiber-to-fiber transmission case was observed by launching 1577 nm wavelength light 175 from the lensed fiber through the waveguide 170 and collecting it with the vertical fiber 160. This quantifies the on-device optical isolation of the upstream signal from the downstream signal. FIG. 10 shows the measured net responsivity of the photodiode 150 (from the facet to the photodiode) in the 1577 nm wavelength region for an example device 100. An isolation of about 20 dB was observed. Part of the leakage is likely due to scattered light at the facet from the fiber coupling, as determined by noting the photocurrent when the lensed fiber is decoupled, and part of the leakage is due to scattering by the grating coupler.

Figure 11A:
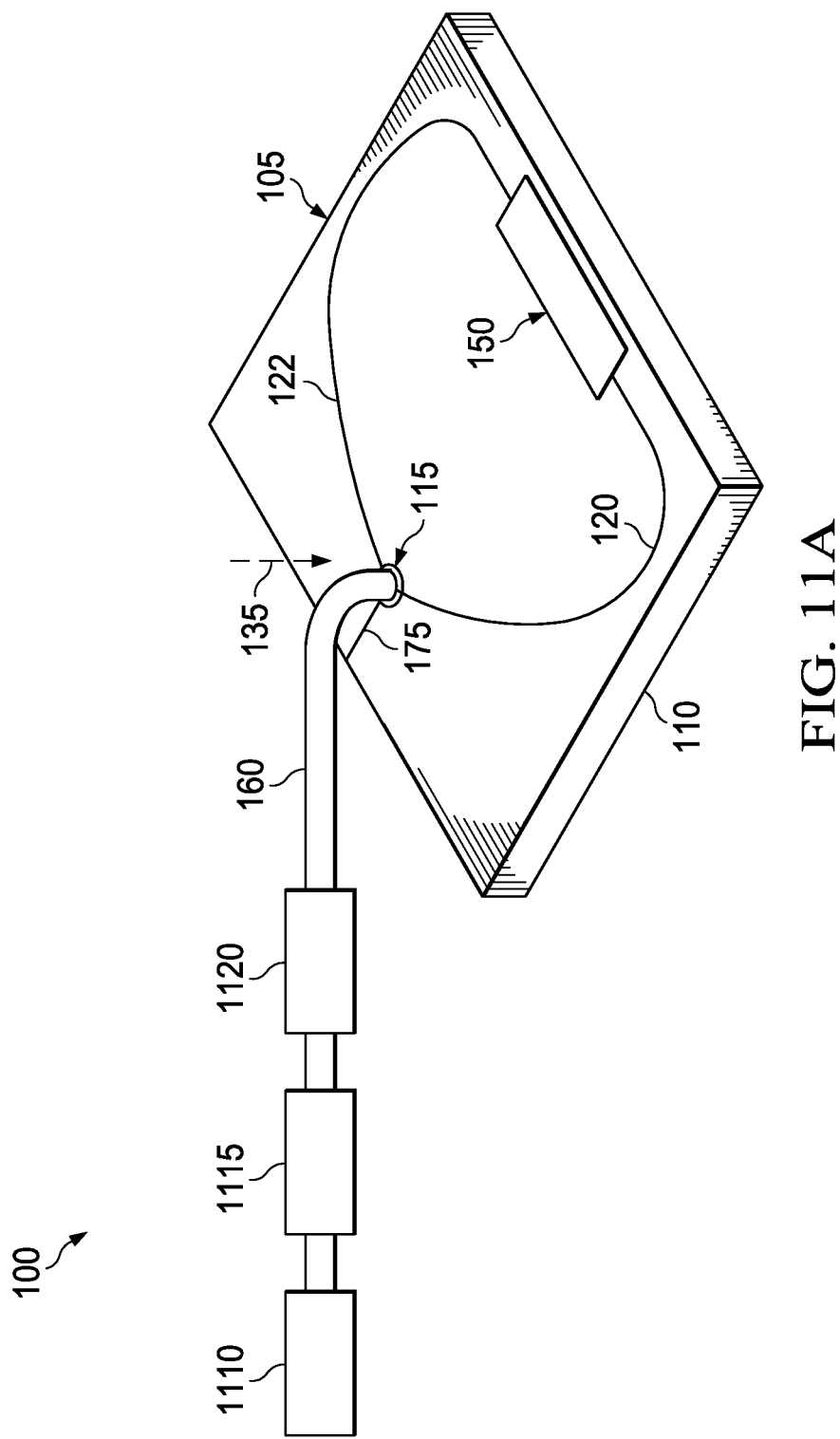
FIG. 11A presents a perspective view of an example optical device, similar to the optical device depicted in FIGS. 1-3.

Another experiment was performed using an example device 100 configuration as shown in FIG. 11A with θ equal to about 2 degrees. FIG. 11B shows, for the device depicted in FIG. 11A, a measured bit-error rate versus the received optical power in the fiber just before reaching the grating, and, the inset diagrams present examples of optical power output at a scale of 100 ps/div.

Light 135 having a wavelength of 1270 nm was launched from a distributed feedback laser 1110, directly modulated (e.g., a pseudorandom bit sequences, PRBS, of $2^{31}-1$ at a data transmission rate of 3 Gb/s), into the grating 115. The laser light 135 signal passed through a mechanical polarization scrambler 1115 and a variable optical attenuator 1120 before entering the device 100. The optical fiber's 160 position was adjusted laterally with respect to the grating 115 to find the location of minimum polarization-dependent loss. This location was approximately 3 dB lower in responsivity compared to the location with optimized coupling for one polarization. This additional loss could be reduced by apodizing the grating 115, (see e.g., Ref. 3) (VI). FIG. 11B shows the measured bit-error rate (BER) versus the received optical power (in the fiber 160, just before the grating 115) without and with the polarization scrambler 1115 turned on. The loss with the polarization scrambler on equaled about 1.3 dB at $10^{-9}$ BER. This low loss shows that the disclosed polarization diversity scheme is effective.

The following references are incorporated herein in their entirety:
1. J. Wang, et al., "Evanescent-coupled Ge p-i-n photodetectors on Si-waveguide with SEG-Ge and comparative study of lateral and vertical p-i-n configurations," Electron Device Letters, IEEE, vol. 29, pp. 445-448, May 2008.
2. C. R. Doerr, M. Zirngibl, C. H. Joyner, L. W. Stulz, and H. M. Presby, "Polarization diversity waveguide grating receiver with integrated optical preamplifiers," IEEE Photon. Technol. Lett., vol. 9, pp. 85-87, January 1997.
3. W. Bogaerts, D. Taillaert, P. Dumon, D. Van Thourhout, R. Baets, and E. Pluk, "A polarization-diversity wavelength duplexer circuit in silicon-on-insulator photonic wires," Opt. Exp., pp. 1567-1578, 2007.
4. F. Van Laere, W. Bogaerts, P. Dumon, G. Roelkens, D. Van Thourhout, and R. Baets, "Focusing polarization diversity grating couplers in silicon-on-insulator," J. Lightwave Technol., vol. 27, pp. 612-618, March 2009.
5. F. Van Laere, et al., "Nanophotonic polarization diversity demultiplexer chip," J. Lightwave Technol., vol. 27, pp. 417-425, 2009.

Although the embodiments have been described in detail, those of ordinary skill in the art should understand that they could make various changes, substitutions and alterations herein without departing from the scope of the disclosure.

What is claimed is:

1. An optical device, comprising:
a substrate having a planar surface and having an optical core thereon;
a two-dimensional grating located in the optical core, said two-dimensional grating being formed by a regular two-dimensional pattern of light-refractive structures, one of said light-refractive structures being located at each node of a regular 2D lattice located in a laterally bounded region, and
first and second optical waveguides located in different portions of the optical core and in a same plane as the optical core, and having ends end-coupled to the two-dimensional grating, the first optical waveguide being such that a direction of propagation through the laterally bounded region is parallel with the planar surface and near the end thereof is substantially along one of two primitive lattice vectors of said 2D lattice, the second optical waveguide being such that a direction of propagation through the laterally bounded region is parallel with the planar surface and near the end thereof is not-parallel to said primitive lattice vectors of said regular 2D lattice; and
a third optical waveguide being on the planar substrate and having an end end-coupled to the two-dimensional grating, the third optical waveguide being such that a direction of propagation near the end thereof is substantially not parallel to said primitive lattice vectors of said 2D lattice.

2. The device of claim 1, wherein the third optical waveguide is located in different portions of the optical core and in a same plane as the optical core on the planar substrate.

3. The device of claim 1, wherein one of said one or more waveguides carries a first polarized portion of light and another of said one or more waveguides carries a different second polarized portion of said light.

4. The device of claim 3, wherein said polarized portions of said light are separately directed by two different ones of said waveguides to different ends of a photodiode integrated in said optical device.

5. The device of claim 1, further including an optical fiber oriented to direct light towards said planar surface of the planar substrate such that said directed light passes into the two-dimensional grating.

6. The device of claim 5, wherein an axis of an end-portion of said optical fiber is tilted by an angle of about 2 to 10 degrees with respect to a normal vector to said planar surface.

7. The device of claim 1, wherein said regular 2D lattice has either said primitive lattice vectors of different lengths or said primitive lattice vectors that are neither parallel nor perpendicular.

8. The device of claim 1, wherein the two-dimensional grating is configured to couple light of a first wavelength from an optical fiber to one of the optical waveguides and to couple light of a second wavelength to the optical fiber from the other of the optical waveguides.

9. An optical device, comprising:
a substrate having a planar surface and having an optical core thereon;
a two-dimensional grating located in the optical core, said two-dimensional grating being formed by a regular two-dimensional pattern of light-refractive structures, one of said light-refractive structures being located at each node of a regular 2D lattice located in a laterally bounded region, and
first and second optical waveguides being on the planar substrate and having ends end-coupled to the two-dimensional grating, the first optical waveguide being such that a direction of propagation near the end thereof is substantially along a primitive lattice vector of said 2D lattice, the second optical waveguide being such that a direction of propagation near the end thereof is not-parallel to a primitive lattice vector of said regular 2D lattice, and wherein the two-dimensional grating is configured to couple light of a first wavelength from the optical fiber to one of the optical waveguides and to couple light of a second wavelength to the optical fiber from the other of the optical waveguides and a wavelength of said light is equal to about $a \cdot n_{eff}/\sqrt{2}$, where a is a center-to-center distance between adjacent ones of said light refractive structures and $n_{eff}$ is an effective refractive index of said two-dimensional grating.

10. An optical device, comprising:
a substrate having a planar surface and having an optical core thereon;

a two-dimensional grating located in the optical core, said two-dimensional grating being formed by a regular two-dimensional pattern of light-refractive structures, one of said light-refractive structures being located at each node of a regular 2D lattice located in a laterally bounded region, and first and second optical waveguides being on the planar substrate and having ends end-coupled to the two-dimensional grating, the first optical waveguide being such that a direction of propagation near the end thereof is substantially along a primitive lattice vector of said 2D lattice, the second optical waveguide being such that a direction of propagation near the end thereof is not-parallel to a primitive lattice vector of said regular 2D lattice, and wherein the two-dimensional grating is configured to couple light of a first wavelength from the optical fiber to one of the optical waveguides and to couple light of a second wavelength to the optical fiber from the other of the optical waveguides and a wavelength of said second light is equal to about $a \cdot n_{\mathit{eff}}$, where a is equal to a periodic center-to-center distance between adjacent ones of said light-refractive structures in a given primitive lattice vector and $n_{\mathit{eff}}$ an effective refractive index of said two-dimensional grating.

11. The device of claim 10, wherein said light, having a first wavelength, is transmitted to said two-dimensional grating through an optical fiber located above said planar substrate, and said second light, having a different second wavelength, is transmitted out of said two-dimensional grating at said angle and into said optical fiber.

12. The device of claim 11, wherein said a and said angle have values that simultaneously satisfy the relationships:

$$k_{out,X} = k_{in,X}\sin\theta + \frac{2\pi}{a},$$

where $k_{in,X}=2\pi n_{cl}/(\lambda 2)$ and $k_{out,X}=2\pi n_{\mathit{eff}}/(\lambda 2)$, and $$k_{out,M}^2 = \left(\frac{2\pi}{a}\right)^2 + \left(\frac{2\pi}{a} - k_{in,M}\sin\theta\right)^2,$$

where $k_{in,M}=2\pi n_{cl}/(\lambda 1)$ and $k_{out,M}=2\pi n_{\mathit{eff}}/(\lambda 1)$, and, where $\lambda 1$ is said first wavelength, $\lambda 2$ is said second wavelength, and $\theta$ is an incident angle of said angle away from a normal angle to said planar substrate.

13. An optical device, comprising:
a substrate having a planar surface and having an optical core thereon;
a two-dimensional grating located in the optical core, said two-dimensional grating being formed by a regular two-dimensional pattern of light-refractive structures, one of said light-refractive structures being located at each node of a regular 2D lattice located in a laterally bounded region, and
two or more optical waveguides located in different portions of the optical core and in a same plane as the optical core and having ends end-coupled to the two-dimensional grating, such that for at least one of the optical waveguides, a direction of propagation near said end thereof and through said laterally bounded region is substantially along a non-primitive lattice vector of said regular 2D lattice.

14. A method of using an optical device, comprising:
transmitting a light through an optical coupler, including:
directing said light towards a two-dimensional grating in a optical core layer, said light being directed at an angle that is substantially normal to a planar substrate that said optical core layer is located on, wherein said two-dimensional grating being formed by a regular two-dimensional pattern of light-refractive structures, one of said light-refractive structures being located at each node of a regular 2D lattice located in a laterally bounded region; and
diffracting said light in said two-dimensional grating such that said light exits from said laterally bounded region to said two-dimensional grating into first, second and third optical waveguides being on the planar substrate and in a same plane as the optical core layer and having ends end-coupled to different portions of the two-dimensional grating,
the first optical waveguide being such that a direction of propagation there-through is parallel with the planar surface and near the end thereof is substantially along one of two primitive lattice vectors of said 2D lattice,
the second optical waveguide being such that a direction of propagation there-through is parallel with the planar surface and near the end thereof is not-parallel to said primitive lattice vectors of said regular 2D lattice, and
the third optical waveguide being such that a direction of propagation there-through is parallel with the planar surface and near the end thereof is not-parallel to said primitive lattice vectors of said 2D lattice.

15. The method of claim 14, wherein said propagation direction of said light is reversed.

16. The method of claim 14, further including transmitting a second light through said optical coupler, wherein said second light has a different wavelength than said light, said transmitting including:
directing said second light to said two-dimensional grating by passing said second light through said third optical waveguide.

17. The method of claim 14, further including, transmitting a second light through said optical coupler, wherein said second light has a different wavelength than said light, said transmitting including:
directing said second light to said two-dimensional grating, said second light being directed at said angle; and
defracting said second light in said two-dimensional grating such that said second light exits said two-dimensional grating through said third optical waveguide.

18. A method of manufacturing an optical device, comprising:
fabricating an optical coupler on a planar substrate, including:
forming a two-dimensional grating, including:
forming a optical core layer on said substrate;
patterning said optical core layer to form a periodic arrangement of light-refractive structures, one of said light-refractive structures being located at each node of a regular 2D lattice located in a laterally bounded region; and
patterning said optical core layer to form first, second and third optical waveguides on the planar substrate and in different portions of the optical core layer and having ends end-coupled to the two-dimensional grating,
the first optical waveguide being such that a direction of propagation near the end thereof and through the laterally bounded region is substantially along one of two primitive lattice vectors of said 2D lattice, the second optical waveguide being such that a direction of propagation near the end thereof and through the laterally bounded region is not-parallel to said primitive lattice vectors of said regular 2D lattice, and the third optical waveguide being such that a direction of propagation there-through is parallel with the planar surface and near the end thereof is not-parallel to said primitive lattice vectors of said 2D lattice.

19. The method of claim 18, wherein patterning of said optical core layer to form said periodic arrangement of light-refractive structures further includes etching holes in said optical core layer, each of said holes comprising individual ones of said light-refractive structures, and wherein adjacent ones of said holes in a same row have a same center-to-center separation distance, and at least one lateral dimension of said holes equals about one-half of said separation distance.

* * * * *